United States Patent
Maenz

(10) Patent No.: US 9,315,256 B2
(45) Date of Patent: Apr. 19, 2016

(54) FLAP ARRANGEMENT AND AIRCRAFT WITH AT LEAST ONE FLAP ARRANGEMENT

(71) Applicant: Airbus Operations GmbH, Hamburg (DE)

(72) Inventor: Christian Maenz, Hamburg (DE)

(73) Assignee: Airbus Operations GmbH (DE)

( * ) Notice: Subject to any disclaimer, the term of this patent is extended or adjusted under 35 U.S.C. 154(b) by 380 days.

(21) Appl. No.: 13/849,738

(22) Filed: Mar. 25, 2013

(65) Prior Publication Data

US 2013/0256461 A1    Oct. 3, 2013

Related U.S. Application Data

(60) Provisional application No. 61/616,010, filed on Mar. 27, 2012.

(30) Foreign Application Priority Data

Mar. 27, 2012   (DE) .......................... 10 2012 006 187

(51) Int. Cl.
*B64C 9/02*   (2006.01)

(52) U.S. Cl.
CPC .. *B64C 9/02* (2013.01); *Y02T 50/32* (2013.01); *Y02T 50/44* (2013.01)

(58) Field of Classification Search
CPC ......................................................... B64C 9/02
See application file for complete search history.

(56) References Cited

U.S. PATENT DOCUMENTS

| 2,155,513 | A | * | 4/1939 | Tampier | 74/469 |
| 4,595,158 | A | * | 6/1986 | Robinson | 244/99.14 |
| 5,110,072 | A |   | 5/1992 | Owl | |
| 5,344,103 | A | * | 9/1994 | Fitzgibbon et al. | 244/213 |
| 6,270,039 | B1 | * | 8/2001 | Linjama | 244/213 |
| 6,739,550 | B2 | * | 5/2004 | Koizumi et al. | 244/99.4 |
| 6,869,050 | B1 |   | 3/2005 | Burchard | |
| 7,051,982 | B1 | * | 5/2006 | Johnson | 244/215 |
| 7,175,132 | B2 | * | 2/2007 | Moreno | 244/99.13 |
| 7,229,046 | B2 | * | 6/2007 | DuRant | 244/76 A |
| 8,038,093 | B2 | * | 10/2011 | Llamas Sandin et al. | 244/87 |

(Continued)

FOREIGN PATENT DOCUMENTS

| DE | 10346982 A1 | 5/2005 |
| DE | 102006030315 A1 | 1/2008 |
| GB | 734959 A | 8/1955 |

*Primary Examiner* — Joseph W Sanderson

(74) *Attorney, Agent, or Firm* — Lerner, David, Littenberg, Krumholz & Mentlik, LLP

(57) ABSTRACT

A flap arrangement includes a basic body, a hinge arrangement, and a flap that by the hinge arrangement is movably held on the basic body. The hinge arrangement includes at least three bearing points spaced apart from each other and arranged on a shared hinge line, wherein two bearing points are rigidly connected to the basic body and to the flap, and wherein the remaining bearing points in each case allow local movement between the basic body and the flap in at least one first spatial direction perpendicularly to the hinge line. Thus, load-induced constraint forces between the basic body and the control surface can be prevented.

18 Claims, 5 Drawing Sheets

(56) References Cited

U.S. PATENT DOCUMENTS

| | | |
|---|---|---|
| 8,398,019 B2 | 3/2013 | Schlipf |
| 8,844,878 B2* | 9/2014 | Voss et al. .................. 244/216 |
| 2003/0080246 A1* | 5/2003 | Koizumi et al. ............ 244/75 R |
| 2005/0178897 A1* | 8/2005 | Moreno ....................... 244/75 R |
| 2007/0102588 A1* | 5/2007 | DuRant ........................ 244/215 |
| 2009/0127406 A1* | 5/2009 | McDonald .................. 244/90 R |
| 2009/0146016 A1* | 6/2009 | Kordel et al. ................. 244/215 |
| 2009/0159755 A1* | 6/2009 | Gonzalez Gozalbo et al. ............................ 244/215 |
| 2011/0101174 A1* | 5/2011 | Voss et al. ..................... 244/213 |
| 2012/0181383 A1* | 7/2012 | Suzuki et al. ................ 244/99.5 |

\* cited by examiner

FLAP ARRANGEMENT AND AIRCRAFT WITH AT LEAST ONE FLAP ARRANGEMENT

CROSS-REFERENCE TO RELATED APPLICATIONS

This application claims the benefit of the filing date of U.S. Provisional Patent Application No. 61/616,010, filed Mar. 27, 2012, the disclosure of which is hereby incorporated herein by reference.

TECHNICAL FIELD

The invention relates to a flap arrangement and an aircraft with at least one flap arrangement.

BACKGROUND OF THE INVENTION

For controlling an aircraft, usually control surface arrangements or flap arrangements are used that are, in particular, arranged on trailing edges of wings or tail units. Attaching pivotable flaps is possible in various ways. Relatively small flaps may, for example, be mounted by way of a hinge arrangement with two points of articulation on a basic body in order to ensure the introduction of forces between the flap and the basic body in question. Where relatively slender and long flaps are used it is, however, necessary to use a hinge arrangement with more than just two points of articulation which are arranged along a shared hinge line so as to be spaced apart from each other.

Taken in isolation, the basic body that carries the movable flap may mechanically be considered to be a clamped carrier that is statically held in a defined manner. However, as a result of attaching a movable flap to the base body by means of a hinge arrangement the overall system is statically over-determined. In particular when exterior forces, for example, forces resulting from air or inertia, act on the system, this results in constraint forces occurring between the basic body and the flap. If, under load, the basic body assumes a bending line that results from elastic deformation, the flap needs to adapt to the aforesaid and vice versa. This results in significant constraint forces in particular if the flap assumes a deflected position relative to the basic body.

DE 10 346 982 A1 discloses a wing assembly profile structure of an aircraft in which beads are formed in a movably held flap, which beads result in elastic deformability of the flap in order to reduce deformation-induced constraint forces.

DE 10 2006 030 315 A1 discloses a high-lift system on the wing of an aircraft, in which high-lift system on at least one drive station required for moving a flap an elastic element to compensate for relative movements in the winch chord direction is provided in order to prevent the occurrence of constraint forces.

BRIEF SUMMARY OF THE INVENTION

An aspect of the invention proposes a flap arrangement comprising a basic body, a hinge arrangement and a flap that by means of the hinge arrangement is movably held on the basic body, in which flap arrangement constraint forces between the flap and the basic body are eliminated to the greatest extent possible.

A flap arrangement comprises a basic body, a hinge arrangement and a flap that by means of the hinge arrangement is movably held on the basic body, wherein the hinge arrangement comprises at least three bearing points spaced apart from each other and arranged on a shared hinge line, wherein two bearing points are rigidly connected to the basic body and the flap, and wherein the remaining bearing points in each case allow local movement between the basic body and the flap in at least one first spatial direction perpendicularly to the hinge line.

The basic body may be a structural part of a vehicle, and in particular of an aircraft, which structural part is, for example, arranged so as to be affixed on one side to a fuselage structure and carries the movable flap. In terms of providing an understanding, and in terms of the scope of protection, the type of basic body is immaterial. For example, the basic body could be a tail unit body of an aircraft.

In a simple case the hinge arrangement may comprise an arrangement of joint yokes with hinge fittings that are insertable in the joint yokes and with pins to affix the aforesaid, which are distributed at predetermined spacing relative to each other on the basic body or on the flap. Accordingly, the hinge line may be imagined as an extension of an imaginary connection line through all the holes of the joint yokes or of the hinge fittings in which the pins are to be arranged. In the absence of a load acting on the flap arrangement the hinge line is a straight line. In practical application frequently the joint yokes are on the basic body and the hinge fittings are on the movable flap, for example on control surface spars that are spaced apart from each other, in cases where the flap comprises spars and sheeting arranged thereon. In this arrangement the spacing between the individual bearing points and the spacing between the control surface spars are coordinated.

The constraint forces between the movably held flap and the basic body arise when an external load acts on the flap arrangement so that elastic deformation of the basic body and/or of the flap occurs. The problem may be illustrated by means of two sheets of paper that in a narrow region overlap and that are curved along their longitudinal sides. If an attempt is made to place one of the sheets of paper relative to the other sheet of paper by an angle to a transverse direction, as a result of the curvature their facing edges can only be aligned to each other at two points.

Analogous to the aforesaid, thus by limiting the rigid connection to the basic body and to the flap to two bearing points it is possible from a statically over-determined system to achieve a statically determined system in which load-induced deformation may be compensated for even with the flap angled out. The movability of the local connection between the flap, the remaining bearing points and the basic body result in no constraint forces, except for a minimum, arising in the respective other body.

This measure may comprise all the bearing points that do not form part of the two bearing points that are rigidly connected to the flap and the basic body. The additional degrees of freedom may thus to the greatest possible extent eliminate the constraint forces so that the flap has to follow the deformation of the basic body in the transverse direction, but the very high stress in longitudinal direction is avoided. Furthermore, it must be expected that the flap is deformed to a somewhat lesser extent when compared to known flap arrangements in the state of the art.

As a result of the construction according to an embodiment of the invention, by reducing the constraint forces the stress in shell components of a flap may be reduced significantly, approximately by two thirds or more. In turn, the reduced constraint forces result in a significant reduction in the loads occurring on the basic body. Furthermore, control surface bearing yokes on the basic body, which control surface bearing yokes are subjected to buckling strain, are considerably relieved. This is associated with substantial savings in weight, which improves the efficiency of the aircraft.

In an advantageous embodiment, the first spatial direction extends parallel to a first main direction of extension of the flap. If the basic body is a rather flat component which is followed by a rather flat component as a flap, a main direction of extension may extend so as to be perpendicular to the hinge line along the planar region of the flap. Thus the basic body hardly needs any pivot space or movement space because the bearing point in question may nevertheless be rigidly integrated on or in the basic body. Movability relative to the bearing point is then possible by a corresponding position-changeable or axially displaceable attachment of the flap.

In an equally advantageous embodiment, the first spatial direction extends parallel to a first main direction of extension of the basic body. Mobility perpendicularly to the hinge line along the planar region of the basic body is thus ensured. This may be possible by means of a variable-length or axially displaceable attachment of the point of articulation in the basic body, for example by means of an axially guided hinge yoke or the like. Attachment of the flap may continue to be implemented rigidly on the bearing point in question; however, axially movable attachment would also be imaginable.

In an advantageous embodiment the two rigid bearing points are outer bearing points that enclose at least one inner bearing point. This may make sense in the case of shorter flap arrangements with a particularly rigid basic body.

In an equally advantageous embodiment at least one of the two rigid bearing points is not an outer bearing point. This is advantageous in particular in the case of longer flap arrangements due to the smallest-possible shape deviation between the flap and the basic body, in which flap arrangements pronounced load-induced movement can occur when viewed along the length.

In an advantageous embodiment the hinge arrangement comprises outer bearing points which in each case are spaced apart by at least 15% of the overall width of the basic body from the nearest outer end of the basic body. Preferably, the outer bearing points are in each case spaced apart by at least 25% of the overall width of the basic body from the nearest outer end of the basic body. In this way it is possible to achieve the smallest-possible shape deviations, which do not allow the rise of excessive inherent dynamics of the relative movement of the flap.

In an advantageous embodiment, the two rigid bearing points are adjacent to each other. Particularly if the two rigid bearing points are not the outer bearing points, in this way excessive shape deviation between the flap and the basic body may be prevented.

In an advantageous embodiment the non-rigid bearing points are connected to the flap by means of a linear guide, wherein the linear guide extends so as to be largely parallel to a plane of extension of the flap. The linear guide makes it possible to very precisely specify the possible movement direction of a connection point on the flap with the respective point of articulation.

In an equally advantageous embodiment the non-rigid bearing points are connected to the basic body by means of a linear guide, wherein the linear guide extends so as to be largely parallel to a plane of extension of the basic body. The linear guide thus allows precise local guidance on the basic body.

For a particularly low-maintenance and reliable design of the linear guide, in an advantageous embodiment said linear guide may be designed as a slide guide with a slide bushing and a slide body. In this arrangement it does not matter whether the slide bushing or the slide body is attached to the respective bearing point. However, it might be expedient to arrange the component with the greater moment of inertia on the bearing point.

In an equally advantageous embodiment the linear guide may be designed as a linear antifriction bearing that has particularly low friction characteristics and may furthermore be used within a large temperature range.

In a furthermore advantageous embodiment the linear guide is designed as a parallelogram guide by means of which in particular the flap may enter a slidable connection to bearing points. The term "parallelogram" refers to a mechanism comprising articulated interconnected bars in the form of a parallelogram, which mechanism allows approximately straight-line movement at a constant angle of inclination even under load.

In a likewise advantageous embodiment the bearing points are in each case connected to a spar arranged in the flap. With the use of the flap arrangement according to the invention in an aircraft, lightweight construction methods are normally used, in which methods flaps comprise spars and sheet-like delimitation components arranged thereon. The introduction of force is thus, in particular, provided at the spars. The connection may be established by riveting, screwing, bonding, welding or laminating.

In an advantageous embodiment the flap comprises a first shell and a second shell which, as sheeting or as an autonomous body, define the actual fundamental shape of the basic body. At least one of the first shell and of the second shell comprises at least one discontinuation. The term "discontinuation" refers to the design of a region with discontinuous materials' properties in order to promote a degree of elasticity of the flap. Due to the change in shape of a flap arrangement when subjected to external loads, such discontinuations may favor a desired way of buckling or a buckling line, and consequently the position of the movable bearing points is optimally taken account of by an occurring change in shape of the flap.

In an advantageous embodiment the at least one discontinuation is designed as an elastically resilient formation. Thus on the one hand a continuity of the material may be ensured that can avoid thermal distortions in the flap, and on the other hand a certain elasticity is favored.

In this arrangement the elastically resilient formation may be selected from a group of formations, wherein the group comprises a convex shape, a concave shape, a bead, a kink or in each case a plurality of the aforesaid. In this arrangement the term "convex shape" refers to a dent-like bulge directed outwards that extends to a greater height than that of adjacent areas. In contrast to this, the term "concave shape" refers to a dent-like bulge directed inwards that extends to a lesser height than that of adjacent areas. However, in the implementation of the flap arrangement according to the invention on an aircraft, provisions must always be made to prevent, to the greatest extent possible, the aerodynamic characteristics of the flap from being influenced by the respective formation, in an attempt to be able to ensure adequate aerodynamic quality.

In an equally advantageous embodiment, the at least one discontinuation may be designed as a materials discontinuity. This means that in the at least one discontinuation there is no material that is continuously the same or no continuous material with a constant thickness. Instead, the at least one discontinuation may be a gap that is closed by means of a slide seal in order to keep the flap surface completely closed. On the other hand the shell material may be substituted by some other material, which is more elastic, for example by rubber, caoutchouc, silicon or other suitable plastics or more elastic metals. In this manner an adequate region of the shell material may be elastically designed so that any remaining residual constraint forces are avoided. Since the tendency to deformation is reduced by a significant reduction in the constraint forces, relatively modest relative movement of the interrupted flap surface components can be expected.

In an advantageous embodiment the basic body is designed as a tail unit body of an aircraft, and the flap is designed as a control surface. The term "tail unit body" may, for example, refer to a vertical stabilizer body that usually comprises a rigid tail unit spar with sheeting arranged thereon. The control surface is designed as a single-part or multi-part rudder, wherein in the case of a multi-part design of the rudder each of the rudder components may comprise a hinge arrangement with more than two bearing points, wherein the bearing points arranged between the outer bearing points may be movable according to the invention. Likewise, the design may also relate to a horizontal stabilizer.

In an advantageous embodiment at least one sealing element is arranged on the flap, which sealing element extends to the basic body and may be displaced in the base body or relative to the base body. The sealing element improves the aerodynamic quality of the flap arrangement, because influencing the flow around the flap arrangement by a slot flow or gap flow is largely prevented. Furthermore, paint damage to the flap components or the leading edge components of control surfaces is largely prevented. Because of the movable connection between the bearing points, which are arranged between the outer bearing points, and the flap, adequate movement for the at least one sealing element is to be provided. For reliable covering of the gaps, the sealing element can be designed so as to be elastic and/or spring-loaded.

The invention furthermore relates to an aircraft with an aircraft fuselage and at least one flap arrangement according to the preceding description. In this arrangement the basic body may either be a tail boom or a wing half that is affixed to the aircraft fuselage. Accordingly, the flap can be a control surface, a slat or a high-lift flap.

The use of the flap arrangement is not limited to the trailing edge of a basic body; instead, said flap arrangement may also be used at a leading edge of the basic body.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, even irrespective of their composition in the individual claims or their interrelationships. Furthermore, identical or similar components in the figures have the same reference characters.

FIG. 3 shows a diagrammatic top view of the flap arrangement of FIG. 2a.

DETAILED DESCRIPTION

Figure 1:
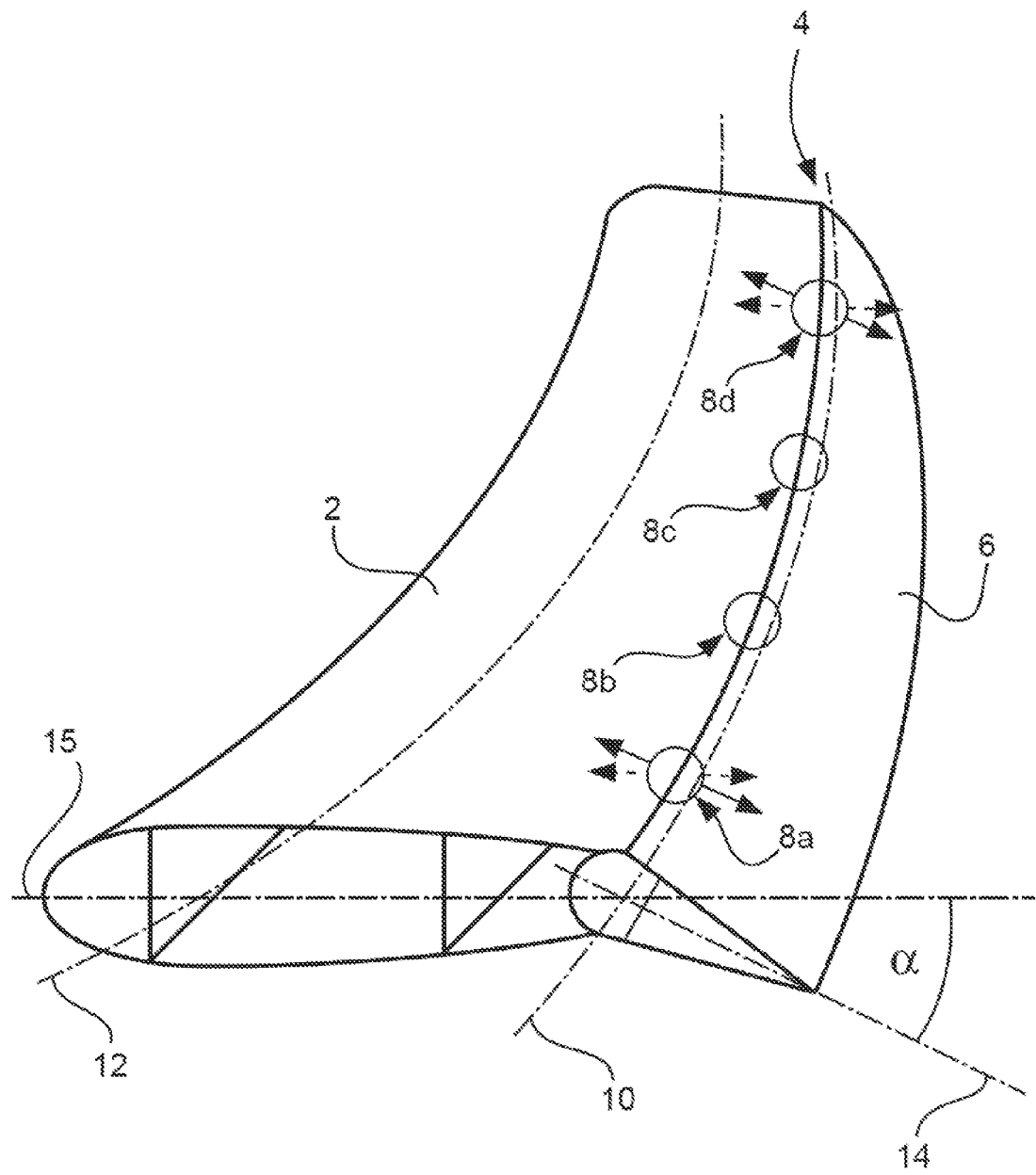
FIG. 1 shows a diagrammatic view of the flap arrangement according to the invention.

FIG. 1 shows a diagrammatic view of the fundamental principle of an embodiment of the invention. A basic body 2 comprises a hinge arrangement 4 by way of which a flap 6 is movably held on the basic body 2. The hinge arrangement 4 comprises several bearing points 8a to 8d that are spaced apart from each other and arranged on a shared hinge line 10. The illustration may, for example, show a vertical stabilizer, wherein the basic body 2 is a tail unit body whose one end is rigidly attached to an aircraft fuselage. As a result of the action of external aerodynamic loads, elastic deformation of the basic body 2 occurs, as is shown by the deformed longitudinal axis 12.

With the use of, for example, four bearing points 8a to 8d, in the case of a continuous rigid connection to all the bearing points 8a to 8d the flap 6 would be force-guided. Consequently the flap 6 would have to deform to such an extent that both the bending line of the basic body 2 and control by an actuator to achieve a flap angle α are ensured. The resulting strong constraint forces may cause structural damage to the flap arrangements, or the flap arrangements necessarily have to be significantly more conservative in their structural design than would be necessary for their actual function.

It is the core idea of an embodiment of the invention to design the connection of only two of the four bearing points 8a to 8d to the flap 6 and to the basic body rigidly or in a fixed manner, while on the remaining bearing points providing movability to the flap 6 or to the basic body 2. Mobility may be ensured in the form of a linear guide that allows movement perpendicularly to the hinge line 10.

Linear movability may be implemented parallel to a main axis of extension 14 of the flap 6 so that local movement of the flap 6 to the non-rigid bearing points, for example the outer bearing points 8a and 8d, is allowed in a direction parallel to the plane of extension of the flap 6. As a result of the linear guide at this planar region a small thickness of the basic body 2 may be achieved because it is not necessary to provide movement space or pivot space outside the plane of extension.

As an alternative, as indicated by the dash-line arrows at the outer bearing points 8a and 8d, local movability of the basic body 2 relative to the bearing points 8a and 8d may be caused, which movability extends parallel to a main axis of extension 15 of the basic body 2. This movability may likewise be achieved by means of a linear guide, which avoids the necessity of a pivot space in the interior of the basic body 2.

Figure 2A:
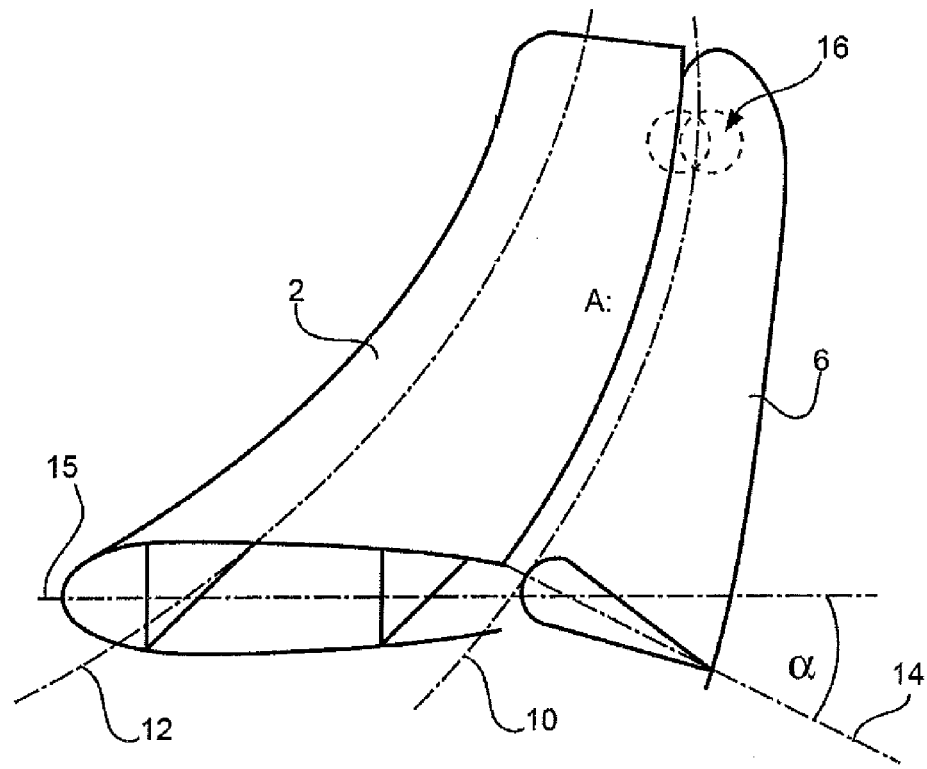
FIG. 2a shows a diagrammatic three-dimensional view of the flap arrangement of FIG. 1 with somewhat exaggerated deformation.
Figure 2E:
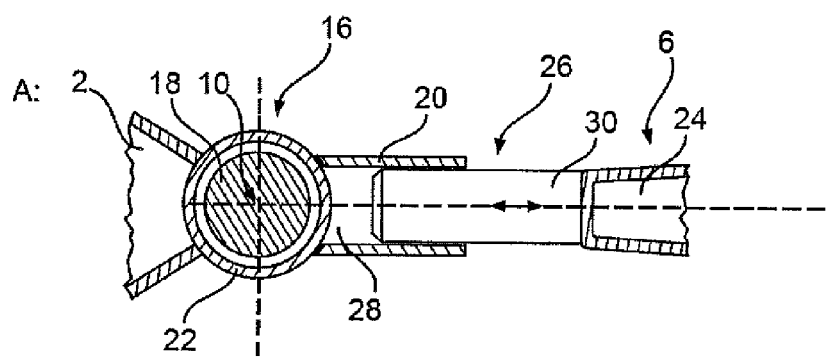
FIGS. 2b and 2e show the relative movement to the flap of FIG. 2a in a cross-sectional top view and a cross-sectional elevational view, respectively.
Figure 2B:
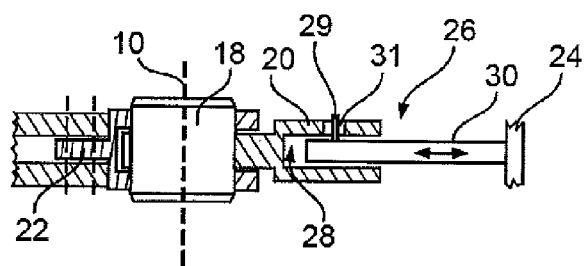
Figure 2C:
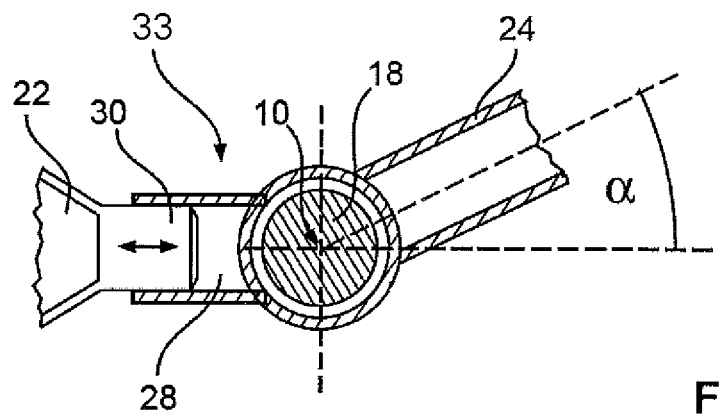
FIGS. 2c and 2f illustrate alternative embodiments in cross-sectional elevational views.
Figure 2F:
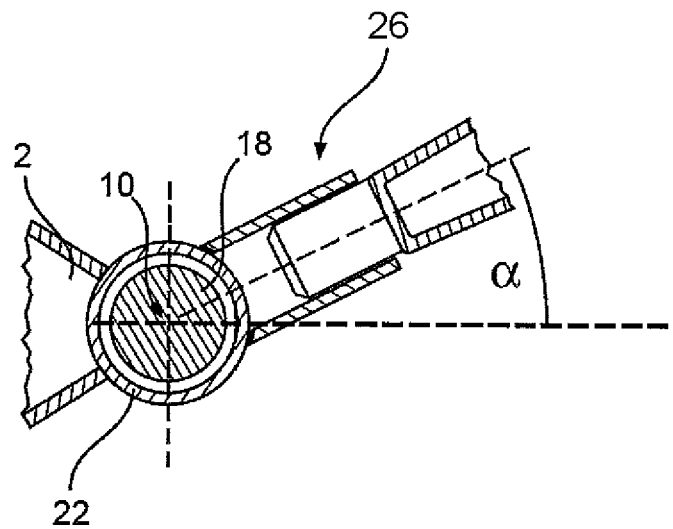

FIG. 2a shows the flap arrangement of FIG. 1, for the sake of clarity illustrated with somewhat exaggerated deformation, wherein two bearing points (not designated with reference characters) situated on the inside are rigidly connected both to the basic body 2 and to the flap. Bearing point 16, designated by a dashed circle and sectional reference character "A" is non-rigid, thus allowing local relative movement of the basic body 2 or of the flap 6. The section is shown in FIGS. 2b and 2c, wherein FIG. 2b shows the relative movement to the flap 6, and FIG. 2c shows the relative movement to the basic body 2. However, the precise design of the connection between the bearing point 16 and the flap 6 is not important; instead, the general manner of functioning is important. Of course, it is also possible to implement linear guidance both between a bearing point 16 under consideration and the basic body 2, and between the bearing point 16 and the flap 6.

As an example, the bearing point 16 comprises a pin 18 that pivotally connects a control surface bearing fitting 20 to a control surface bearing yoke 22. In this arrangement the control surface bearing yoke 22 is, for example, attached to the basic body 6, while the control surface bearing fitting 20 is attached to a spar 24 of the flap 6. The illustration shows an identical load situation as shown in FIG. 1, in which situation the basic body 2 is elastically deformed and the flap 6 is deflected by an angle α relative to the basic body 2. As a result of the deformation and the deflection of the flap 6, as explained in the introduction with reference to the curved sheets of paper, complete congruence of the flap 6 and the basic body 2 may be achieved only at two points. This is, for example, the case on bearing points situated on the inside, so that, in order to largely prevent the occurrence of constraint forces in the bearing point 16, which as an example is situated on the outside, of the connection to the control surface spar 24 or to the basic body 2, linear movability relative to the hinge axis 12 is made possible by means of a linear guide 26.

The linear guide 26 may, in particular, be a slide bushing 28 and a slide body 30. To this effect the control surface fitting 20 itself may form or comprise a slide bushing 28, while on the control surface spar 24 the slide body 30 may be arranged or formed, which slide body 30 is slidably held in the slide bushing 28.

To prevent the slide body 30 from sliding from the slide bushing 28 it makes sense to use limit stops or guide bodies 29, as indicated in the top view of FIG. 2b. The guide body 29 may extend in a slot 31 of the control surface fitting 20 with predefined dimensions so that neither excessive plunging-in nor any sliding-out is possible. The guide body 29 is, for example, screwed in after assembly of the linear guide 26. Of course, the guide body is just one example of any other limit stops or similar means.

FIG. 2c demonstrates the reverse arrangement to that shown in FIG. 2b, in which the connection between the basic body 2 and the bearing point 16 is movable in a linear manner. To this effect the control surface yoke 22 comprises a linear guide 33 that also comprises a slide body 30 and a slide bushing 28.

Figure 2D:
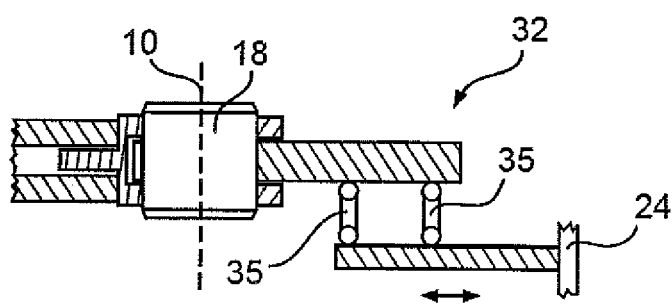
FIG. 2d illustrates an alternative embodiment.

In an alternative embodiment according to FIG. 2d instead of a slide guide it is also possible to use a parallelogram guide 32 with bars 35 arranged so as to be parallel to each other, which parallelogram guide 32 extends between the control surface spar 24 and the control surface bearing yoke 22. In this manner angularly-conformal deflection with concurrent axial movability can be achieved.

Figure 3:
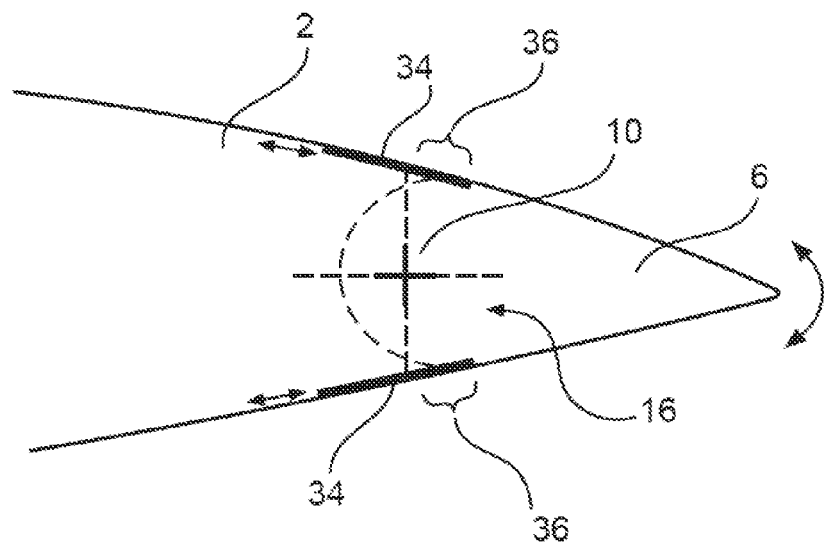

FIG. 3 shows sealing elements 34 that extend between the flap 6 and the basic body 2. As a result of the movability of the flap 6 the sealing elements 34 should be dimensioned so that gaps 36 between the basic body 2 and the flap 6 are always closed. The sealing elements 32 preferably cover the gaps 36 and during movement of the flap 6 may be displaced relative to the basic body 2. If linear movability relative to the flap 2 is required on the exemplary bearing point 16, the sealing elements 34 should be dimensioned in such a manner that with a maximum load acting on the basic body 2 and with maximum deflection a of the flap 6 no gap 36 is open.

Figure 4:
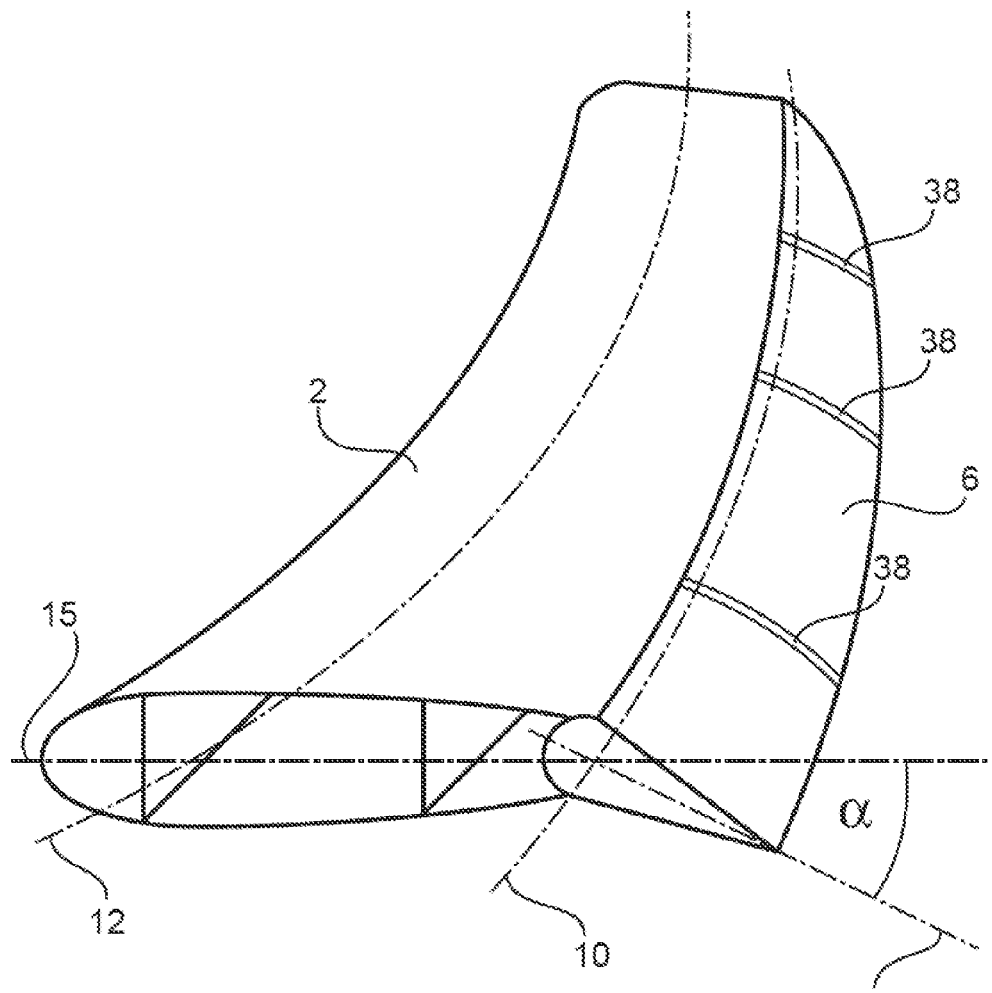
FIG. 4 shows a parallelogram guide as a variant.

FIG. 4 further shows, for example, discontinuations 38 in the flap 6, which flap is designed to comprise discontinuous materials in the form of a local material substitute, a formation or a gap in the material apart from a slide seal for sealing the flap surface. Thus any constraint forces that still remain despite the integration of non-rigid bearings may be prevented by targeted elasticity increases.

Figure 5:
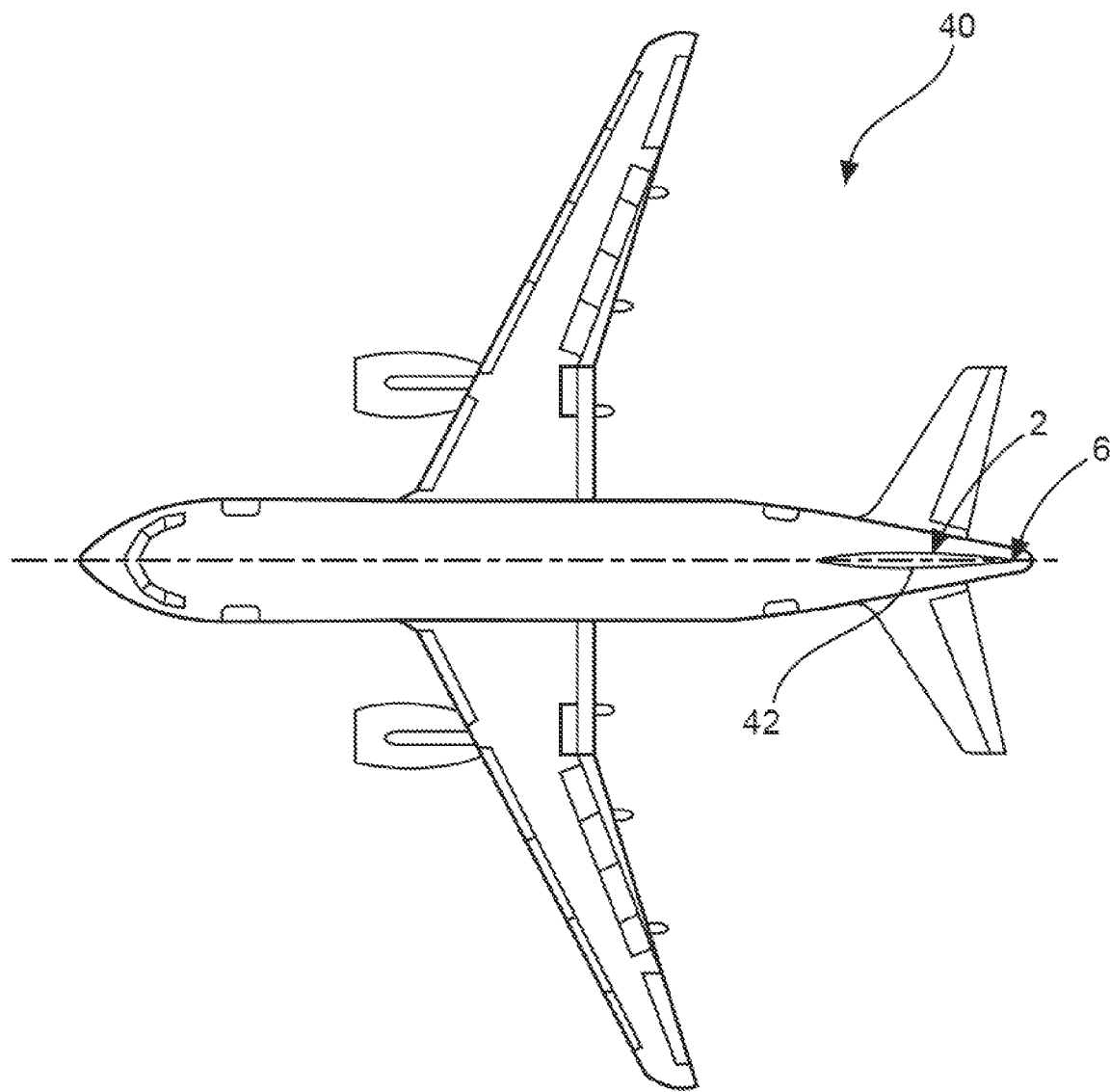
FIG. 5 shows the integration of at least one sealing element between the control surface and the basic body.

Lastly, FIG. 5 shows an exemplary aircraft 40 that comprises a flap arrangement according to the invention on a vertical stabilizer 42. In this arrangement the basic body 2 is designed as a vertical stabilizer body, and the flap 6 is designed as a rudder.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A flap arrangement, comprising:
    a basic body,
    a hinge arrangement, and
    a flap movably held on the basic body by the hinge arrangement,
    wherein the hinge arrangement comprises at least first, second, and third points of articulation spaced apart from each other at a predetermined distance from one another and arranged on a shared hinge line such that, in an absence of a load acting on the flap arrangement, the hinge line is a straight line,
    wherein, at the first and second points of articulation, the flap is rigidly connected to the basic body such that a deformation of the flap at the first and second points of articulation is congruent to a deformation of the basic body, and
    wherein, at remaining one or more non-rigid points of articulation, in each case allow a local relative movement between the basic body and the flap in at least one first spatial direction perpendicularly to the hinge line is allowed such that the deformation of the flap at the remaining one or more non-rigid points of articulation is not congruent to the deformation of the basic body.

2. The flap arrangement of claim 1, wherein the at least one first spatial direction extends parallel to a first main direction of extension of the flap.

3. The flap arrangement of claim 1, wherein the at least one first spatial direction extends parallel to a first main direction of extension of the basic body.

4. The flap arrangement of claim 1, wherein the first and second rigid points of articulation are outer points of articulation in the hinge arrangement.

5. The flap arrangement of claim 1, wherein at least one of the first and second rigid points of articulation is not an outer point of articulation.

6. The flap arrangement of claim 1, wherein the hinge arrangement comprises outer points of articulation which in each case are spaced apart by at least 15% of the overall width of the basic body from the nearest outer end of the basic body.

7. The flap arrangement of claim 1, wherein the first and second rigid points of articulation are adjacent to each other.

8. The flap arrangement of claim 1, wherein, at the remaining one or more non-rigid points of articulation, the flap is connected to the basic body by a linear guide.

9. The flap arrangement of claim 8, wherein the linear guide is a slide guide with a slide bushing and with a slide body.

10. The flap arrangement of claim 8, wherein the linear guide is configured as a linear antifriction bearing.

11. The flap arrangement of claim 8, wherein the linear guide is configured as a parallelogram guide.

12. The flap arrangement of claim 1, wherein, at the remaining one or more non-rigid points of articulation, the basic body is connected to the flap by a linear guide.

13. The flap arrangement of claim 1, wherein the points of articulation are in each case connected to a spar arranged in the flap.

14. The flap arrangement of claim 1, wherein the flap comprises sheeting defining the fundamental shape of the flap, wherein the sheeting comprises at least one discontinuation.

15. The flap arrangement of claim 14, wherein the at least one discontinuation is selected from a group of discontinuations, with the group consisting of:
   elastically resilient formations as a convex shape, a concave shape, a bead, or a kink, in each case a plurality thereof,
   gaps in the flap surface, which gaps in each case are sealed by means of slide seals, and
   materials discontinuities.

16. The flap arrangement of claim 1, wherein the basic body is configured as a tail unit body of an aircraft, and the flap is configured as a control surface.

17. The flap arrangement of claim 16, wherein at least one sealing element is arranged between the control surface and the tail unit body, which sealing element is displaceable relative to the control surface or to the tail unit body.

18. An aircraft, comprising at least one flap arrangement, the flap arrangement comprising:
   a basic body,
   a hinge arrangement, and
   a flap movably held on the basic body by the hinge arrangement,
   wherein the hinge arrangement comprises at least first, second, and third points of articulation spaced apart from each other and arranged on a shared hinge line such that in an absence of a load acting on the flap arrangement the hinge line is a straight line,
   wherein, at the first and second points of articulation, the flap is rigidly connected to the basic body such that a deformation of the flap at the first and second points of articulation is congruent to a deformation of the basic body, and
   wherein, at remaining one or more non-rigid points of articulation, in each case a local relative movement between the basic body and the flap in at least one first spatial direction perpendicularly to the hinge line is allowed such that the deformation of the flap at the remaining one or more non-rigid points of articulation is not congruent to the deformation of the basic body.

* * * * *